Figure 1:
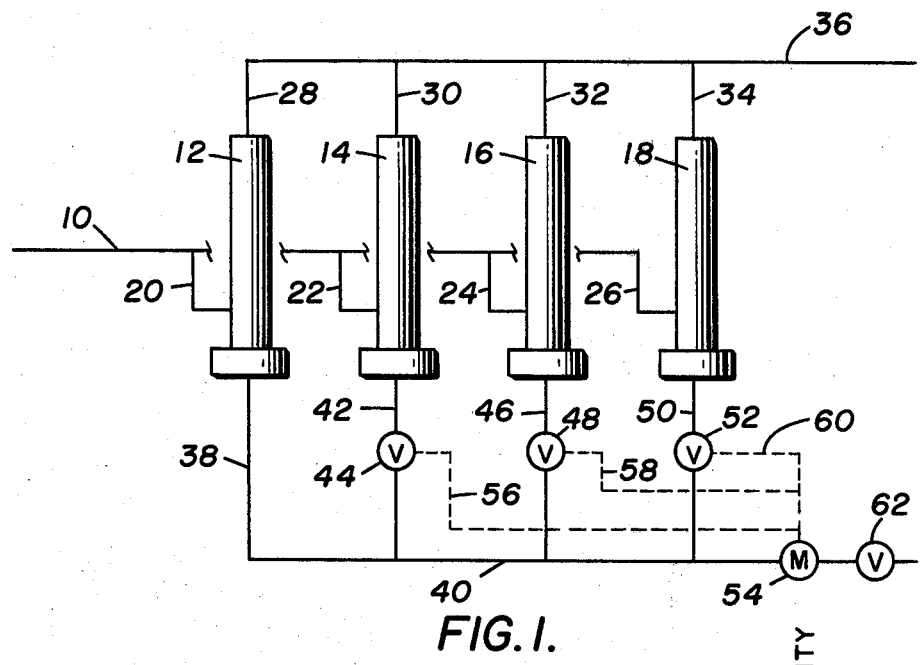

United States Patent [19]

King et al.

[11] 4,397,661
[45] Aug. 9, 1983

[54] GAS PERMEATION APPARATUS HAVING PERMEATE RATE CONTROLLED VALVING

[75] Inventors: Duane E. King, Wake Forest, N.C.; John R. O'Brien, Creve Coeur, Mo.

[73] Assignee: Monsanto Company, St. Louis, Mo.

[21] Appl. No.: 324,881

[22] Filed: Nov. 25, 1981

Related U.S. Application Data

[63] Continuation of Ser. No. 163,547, Jun. 27, 1980, abandoned.

[51] Int. Cl.³ .............................................. B01D 53/22
[52] U.S. Cl. ........................................ 55/158; 55/212; 55/344
[58] Field of Search ............... 210/636, 637, 641, 650, 210/651, 652, 739, 98, 102, 108, 134, 135, 137, 253, 257.2, 295.2, 371, 333.01, 333.1, 340, 341, 433; 55/16, 18, 21, 158, 212, 218, 344

[56] References Cited

U.S. PATENT DOCUMENTS

| | | | |
|---|---|---|---|
| 3,339,341 | 9/1967 | Maxwell et al. | 55/158 |
| 3,503,515 | 3/1970 | Tomsic | 210/321.1 |
| 3,713,271 | 1/1973 | Franz et al. | 55/158 |
| 4,140,499 | 2/1979 | Ozaki et al. | 55/158 |
| 4,162,973 | 7/1979 | Lynch | 210/102 |
| 4,210,627 | 7/1980 | Verloop et al. | 55/18 X |

FOREIGN PATENT DOCUMENTS 43231  1/1982  European Pat. Off. ............ 210/641

*Primary Examiner*—David R. Sadowski
*Attorney, Agent, or Firm*—Robert L. Broad

[57] ABSTRACT

Permeator systems containing selectively permeable membranes suitable for pressure-influenced fluid separations and processes for operating permeator systems for the separation of fluids are disclosed which can provide high turn down ratios of permeate while maintaining substantially constant concentrations of at least one permeating moiety in the permeate. In accordance with the invention, the permeator system comprises a plurality of permeator stages, each of which permeator stages receive a feed stream, and the flow of permeate from at least one permeator stage is initiated and terminated at predetermined rates of permeate fluid flow from the permeator system.

7 Claims, 2 Drawing Figures

GAS PERMEATION APPARATUS HAVING PERMEATE RATE CONTROLLED VALVING

This is a continuation, of application Ser. No. 163,547, filed June 27, 1980 for PERMEATOR SYSTEMS AND PROCESSES, abandoned.

This invention pertains to permeator systems for fluid separations using selectively permeable membranes and processes for operating the permeator systems for fluid separations. Particularly, this invention pertains to permeator systems and processes in which high turn down ratios of rate of permeate fluid flow can be achieved while maintaining a substantially constant concentration of a permeating moiety in the permeate from the permeator system.

Selectively permeable membranes have been proposed for many fluid separations including the separation of moieties from gases and liquids. Particularly attractive selectively permeable membranes utilize a differential in chemical potential as the driving force for the permeation of a moiety through the membrane. Hence, in gas separations, the driving force may be a differential in fugacities (often approximated by partial pressures) across the membrane. In liquid separations, the driving force may be a differential in pressure. These types of separations can be referred to as pressure-influenced separations, i.e., changes in total pressure on at least one of the feed and permeate side of the membrane can significantly affect the flux of moieties permeating through the membrane. The rate at which a moiety can pass through a membrane for pressure-influenced separations thus will depend upon the permeability of the membrane (i.e., the rate of permeation of the moiety per unit area per unit time per unit differential in chemical potential), the differential in chemical potential across the membrane, e.g., the differential in partial pressure for gases and the differential in osmotic pressure for liquids, and the membrane area available to effect the fluid separation (the effective membrane surface area).

The selectivity of fluid separations in permeator systems is provided by the use of membranes exhibiting different permeabilities for different moieties contained in the fluid. A ratio of the permeabilities is frequently referred to as a separation factor. However, the achievable selectivity for a given separation will depend upon not only the separation factor of the membrane but also the driving force for each of the moieties in the fluid. Thus, the conditions of operation of the permeator system will significantly affect the relative concentrations of the moieties in the permeate.

Generally, for a given membrane and feed stream flow rate and composition, the permeator system is designed using two major variables, effective membrane surface area and total pressure differential across the membrane, to produce a permeate having a desired permeating moiety concentration and recovery in the permeate of that moiety. The interdependence of these major variables on the performance of the separation system can easily be appreciated. For example, if the effective membrane surface area is increased, all other variables remaining constant, a greater recovery of the desired permeating moiety will be obtained. However, since the feed stream will become more depleted in a faster permeating moiety than a lower permeating moiety, the driving force for the permeation of the slower permeating moiety will also increase and may become sufficient to significantly increase the ratio of the slower permeating moiety passing through the membrane to the faster permeating moiety passing through the membrane. Hence, additional recovery will be achieved at the expense of purity of the faster permeating moiety in the permeate. Similarly, for a given effective membrane surface area, an increase in total pressure differential across the membrane, all other variables remaining conatant, will also result in the feed stream becoming more depleted in a faster permeating moiety and thus the permeate may contain a greater amount of the faster permeating moiety but at a lower purity.

In many instances, the flow rate and composition of the feed stream are relatively constant and a relatively constant recovery of a permeating moiety may be acceptable and even desired. Consequently, the permeator system can readily be designed to utilize a fixed effective membrane surface area and fixed total pressure differential to provide a desired permeate recovery and concentration. However, such permeator systems have little capability to alter the permeate flow (i.e., permeate turn down ratio capability) without significant changes in the concentration of the desired permeating moiety in the permeate from the permeator system. Although the total pressure differential across the membrane may be variable, limits on feed stream pressure availability, minimum permeate pressure requirements, and maximum total pressure differential which can be tolerated across the membrane, may provide too little flexibility in achieving a desired range of permeate turn down ratios. Effective membrane surface area can also be varied; however, since membranes are usually contained in vessels (permeators) having a fixed effective membrane surface area, only incremental changes in this variable can be made. Such incremental changes in effective membrane surface area may be so large as to prohibit maintaining a suitable permeating moiety concentration over the desired permeate turn down ratio. Although the effect of the incremental changes can be minimized by using more permeators, each containing a smaller effective membrane surface area, the expense in fabricating more permeators may render such a solution unattractive.

By this invention permeator systems and processes are provided for fluid separations using selectively permeable membranes suitable for pressure-influenced fluid separations in which high permeate turn down ratios can be achieved while maintaining substantially constant concentrations of the desired permeating moiety in the permeator system. Moreover, the permeator systems and processes can utilize large permeators which may be less expensive per unit effective membrane surface area to fabricate than smaller permeators. Furthermore, the high permeate turn down ratios can be achieved using relatively uncomplicated apparatus and with minimal capital and operating expense. Advantageously, the rate of permeate from the permeator system can be established by the demand for the permeate and can rapidly change in response to a change in demand. Moreover, changes in the rate of feed stream flow to the permeator system need not be effected to provide the desired permeate turn down ratios.

In accordance with this invention, the permeator system comprises at least two permeator stages (each permeator stage may contain one or more permeators in series, in parallel or both) each permeator system containing selectively permeable membranes suitable for pressure-influenced fluid separations. A feed stream is passed to each of the permeator stages, and the flow of permeate from at least one permeator stage is initiated and terminated at predetermined rates of permeate fluid flow from the permeator system. As the rate of permeate fluid flow changes, the total pressure of the permeate varies to provide sufficient permeate to meet the demand for permeate.

In the permeator systems of this invention, a means for providing a feed stream to the feed side of the selectively permeable membrane is utilized for each of the permeator stages. A means is used for removing the feed stream (not-permeate) from the feed side of the membrane, and each permeator stage also has means for removing fluid from the permeate side of the membrane. At least one of the means for removing fluid from the permeate side contains a means for terminating flow. Each of the means for removing fluid from the permeate side are in communication with means for combining fluid to provide a combined permeate. A means for transporting the combined permeate is used to remove the permeate from the permeator system. The means for transporting the combined permeate comprises means for detecting fluid flow through the means for transporting. This means for detecting fluid flow is adapted to actuate at least one means for terminating flow, i.e., to permit or to terminate permeate flow from the at least one permeator stage, when the fluid flow is at a predetermined rate.

In the processes of this invention, a feed stream containing a permeating moiety and a slower permeating moiety is provided to each of a plurality of permeator stages containing selectively permeable membranes suitable for pressure-influenced fluid separations and each membrane having a feed side and a permeate side and adapted to provide a permeate containing the permeating moiety on the permeate side of the membrane. The feed streams are contacted with the feed sides of the membranes, and the portion of the feed stream not permeating the membrane (not-permeate) is removed from the feed side of the membranes from each of the permeator stages. Permeate passing from each of the permeator stages is combined, and the combined permeate is at a total pressure which is less than the total pressure of the feed streams to each of the permeator stages. Permeate from at least one permeator stage of the permeator system is permitted to pass only when the combined permeate fluid flow surpasses a predetermined rate, and such passage from the at least one permeator stage is terminated only when the combined permeate fluid flow drops below a predetermined rate. The permeate side of the membranes of each permeator stage from which permeate is passing to provide the combined permeate (i.e., operating permeator stage), is maintained at a lower total pressure than the total pressure on the feed side to provide a differential in chemical potential to provide a driving force for the permeation of the permeating moiety through the membrane, and the total pressure on the permeate side of each operating permeator stage is permitted to vary in response to changes in the rate of combined permeate fluid flow. Preferably, the rate of the combined permeate fluid flow is detected, and the passage of the permeate from at least one permeator stage is initiated and terminated in response to the detected rate of combined permeate fluid flow.

In the permeator systems and processes of this invention, the flow rate of permeate from the permeator system can be varied over a wide range of adding or deleting permeate from one or more permeator stages in the permeator system and by permitting the permeate side total pressure to vary within predetermined ranges to meet the demand for permeate. The variations permitted in total pressure on the permeate side can be sufficiently small that a substantially constant concentration of the desired permeating moiety in the permeate can be rapidly achieved over a range of flow rates of permeate. Since a feed stream is passed to each of the permeator stages, regardless of whether or not permeate is passing from a permeator stage, the turn down in flow rate of permeate can frequently be obtained without varying the flow rate of the feed stream to any permeator stage. A particularly attractive advantage of this invention is that the initiation and termination of the flow of permeate from a permeator stage to provide the combined permeate can be in response to the rate of combined permeate fluid flow. Consequently, a change in demand for permeate can be easily sensed by any suitable fluid flow meter, e.g., orifice meters, venturi meters, turbine meters, vortex shedding meters, etc. Since the total pressure of combined permeate changes with the rate of combined permeate fluid flow, in some instances the pressure of the combined permeate may be detected and, at predetermined pressures (which may correspond to rates of combined permeate fluid flow), used to initiate or terminate the passage of permeate from permeator stages. Preferably the flow rate is determined on a basis substantially independent of the total pressure of the permeate since the total pressure of the combined permeate is permitted to vary in response to the demand for permeate. At predetermined rates of combined permeate fluid flow, the passage of permeate from a permeator stage can be initiated or terminated. The permeator system can readily be automated without complex apparatus, e.g., the flow meter can be adapted to actuate a control valve on the permeate exit line from the permeator. Moreover, the valve need only be positioned in either a fully opened or fully closed position, and complex valve positioning apparatus need not be employed.

The selection of the predetermined rates of combined permeate fluid flow at which the passage of permeate from a permeator stage is initiated or terminated can be based on, e.g., the total pressure of the permeate and the concentration of the desired permeating moiety in the permeate. The total pressure of the permeate can have several effects on the permeate. Clearly, if the pressure of the permeate is decreased, the driving force for permeation can be increased, thereby enhancing the recovery of the desired permeating moiety (i.e., the rate of permeate fluid flow is increased). However, the pressure of the permeate can also affect the concentration of the desired permeating moiety in the permeate. For example, at very low pressure differentials, the feed stream and the permeate may tend towards equilibrium, i.e., the composition of the feed stream and permeate may be substantially identical. In fact, in a permeator stage from which the egress of permeate is blocked, after a period of time, the pressures and concentrations on each of the feed side and permeate side of the membrane may be virtually identical. As the total pressure differential increases, the rate of permeation of the faster permeating moiety is enhanced and a greater selectivity of separation is achieved. However, as the feed stream becomes depleted in the faster permeating moiety a greater driving force for the permeation of the slower permeating moiety occurs. Hence, if the feed stream becomes too depleted in the faster permeating moiety, the selectivity of separation may decrease. Thus, if the permeate pressure becomes excessively low, the increased rate of permeation of the faster permeating moiety may result in such a depletion of the faster permeating moiety in the feed stream that the selectivity of separation decreases. Also, the permeate pressure may be so low that the membrane ruptures or is otherwise adversely affected by the large total pressure differential across its thickness. Moreover, the permeate may be sought at a given minimum pressure in order that the permeate may be suitable for use without undue compression.

Preferably, the predetermined rate of combined permeate flow at which the passage of permeate from a permeator stage is initiated is such that the difference in total pressure of the feed stream and the combined permeate is maintained below that which adversely affects the membranes. Frequently, at the predetermined rate of combined permeate fluid flow for the initiating of operation of a permeator stage, the total pressure of the combined permeate is above a predetermined combined permeate minimum pressure. This combined permeate minimum pressure may be established by the strength and other physical properties of the membrane, by assuring a desired minimum permeate pressure for the use of the permeate, or, in some instances, by assuring that an undue reduction in the selectivity of separation does not occur. Also, when the permeator stage begins operation, it is often desired that the concentration of the desired permeating moiety in the combined permeate be above a predetermined minimum concentration. In many instances, the concentration of the desired permeating moiety in the permeate increases with increasing total pressure differential. Thus, it may be desired to establish the predetermined rate of combined permeate fluid flow at a rate at which the concentration of the desired permeating moiety in the combined permeate is below a predetermined maximum. Thus, when the additional permeation stage is brought on line, a lesser total pressure differential is required to provide the same amount of combined permeate and the concentration of the desired permeating moiety in the combined permeate is reduced.

The predetermined rate of combined permeate fluid flow at which the passage of permeate for a permeator stage is terminated may be substantially the same or different from the predetermined rate for the initiation of passage. Generally, the predetermined rate of combined permeate flow at which the passage of permeate is terminated is such that, after termination the concentration of the desired permeating moiety in the combined permeate is above a predetermined minimum concentration.

It should be recognized that the permeator system may not be at a steady state operation immediately upon initiating operation of a permeator stage. For instance, the egress of permeate from the permeator stage may have been blocked and upon initially permitting the permeate to flow from the permeator stage, the existing fluid on the permeate side of the membrane will be expelled from the permeator stage, and thus, the combined permeate may have a substantially lower concentration of the desired permeating moiety during this expulsion. Thus, upon bringing another permeator stage on line to provide permeate or sensing the flow of permeate from a permeator stage, the combined permeate pressure must readjust to provide the desired rate of combined permeate fluid flow. The duration of such transitory non-steady state operation is usually relatively brief, e.g., sometimes less than about 5, say, les than about 1, minute, and consequently may have little effect on the suitability of the combined permeate for its intended use.

In many instances, a single feed stream is passed to the permeator system. Since a feed stream is to be passed to each of the permeator stages, the single feed stream can be divided into feed substreams which are then passed to the permeator stages. The flow rate of the feed streams to each of the permeators may be the same or different, and the feed streams may be at different or, preferably, the same total pressure. In the preferred aspects of this invention, the flow rate of a feed stream to a permeator stage is maintained substantially constant even though the rate of combined permeate fluid flow may vary. Also, particularly when a combined permeate having a substantially constant concentration of the desired permeating moiety is sought, the composition of the feed stream is substantially constant.

The number of permeator stages to be employed will depend upon the desired permeate turn down ratio, the desired tolerance on the concentration of the desired permeating moiety in the combined permeate, the available size of permeators, the flow rate of the feed stream, and the like.

While it is readily apparent that this invention can be used with permeator systems having as little as two permeator stages, generally higher permeate turn down ratios can be achieved utilizing greater numbers of permeator stages and utilizing greater numbers of permeator stages having associated therewith means to terminate permeate flow. Preferably, at least three permeator stages are used, at least two of which have means to terminate permeate flow.

Since this invention provides considerable flexibility achieving high turn down ratios, large permeators which may be less expensive per unit of effective membrane surface area, can often be beneficially utilized. Frequently, the permeate turn down ratio which can be achieved without substantially changing the concentration of the desired permeating moiety in the combined permeate (e.g., the change in concentration is less than about one volume percent based on the total combined permeate) is at least about 2, and may even be at least about 4. With 3 or 4 permeators, it may often be possible to obtain a permeate turn down ratio greater than about 10. The permeate turn down ratio which can be achieved with any given permeator system, of course, depends upon the permissible operating conditions of that system, the physical properties of that system, and the fluids being processes in the permeator. Hence, with a given permeator system, but using a different feed stream component, the separation factor of the selectively permeable membrane may be different and hence different permeate turn down ratios may be obtained.

The permeate from each of the operating permeator stages is combined. The permeate from the non-permeating permeator stages may be blocked from passage from the permeator; hence, little, if any, moieties permeate the membrane. Consequently, the non-permeate from that permeator stage will not become depleted in the faster permeating moiety. This may be advantageous in many instances since the portion of the faster permeating moiety which is lost from the feed stream due to the permeation will only be that amount required to meet the demand for the combined permeate.

Figure 2:
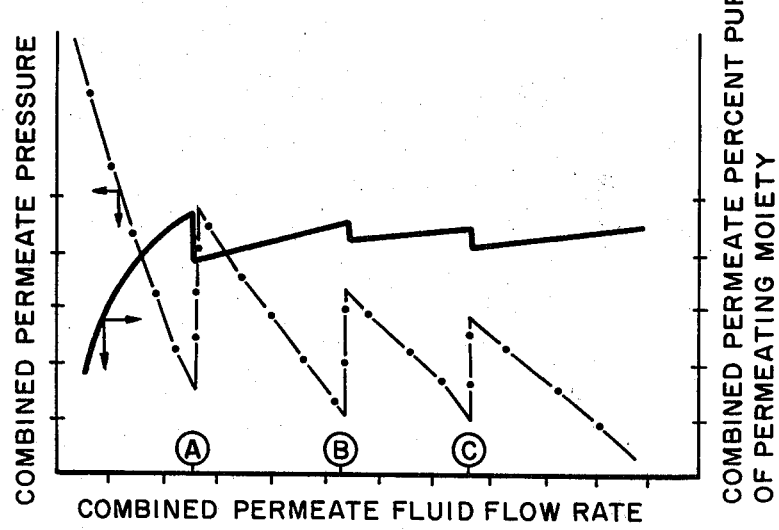

For purposes of facilitating the understanding of the invention, reference is made to the drawings in which:

FIG. 1 is a schematic flow diagram of an apparatus in accordance with this invention; and FIG. 2 is a graphic illustration of the combined permeate fluid flow rate and combined permeate pressure and purity of a process in accordance with this invention.

With respect to FIG. 1, a feed stream is passed via an inlet line 10 to a plurality of permeator stages. The feed stream may be any suitable liquid or gaseous fluid containing at least one moiety which is to be recovered in the permeate through a selectively permeable membrane. Preferably the feed stream is provided at a substantially constant total pressure and a substantially constant composition. The total pressure of the feed stream may be any suitable pressure for effecting fluid separations by permeation through selectively permeable membranes. Often, the feed stream pressure is at least about 3 atmospheres absolute, and frequently it is about 3 to about 250 or more atmospheres absolute. The temperature of the feed stream is preferably below a temperature which may be unduly deleterious to the membranes, e.g., often less than about 120° C. for polymeric membranes, but is at a sufficiently high temperature to facilitate permeation. For example, the temperature of the feed stream may often be about 0° to 100° C., say, about 10° to 60° C.

As depicted, the apparatus comprises four permeators, i.e., permeators 12, 14, 16 and 18. Each of the permeators is fed a feed substream via first connecting lines 20, 22, 24 and 26, respectively. Each feed substream can conveniently be at a substantially constant flow rate. The flow rate of each of the feed substreams to the permeators may be the same or different depending upon the effective membrane surface area available in each of the permeators and the desired permeate recovery and purity from each of the permeators. For example, the ratio of the feed substream flow rate to effective membrane surface area is permeator 12 may be greater than that in permeators 14, 16, or 18 such that a higher concentration of the desired permeating moiety and the permeate from permeator 12 can be achieved at relatively low permeate flow rates. The amount of effective membrane surface area may also be the same or vary from permeator to permeator. The amount of effective membrane surface area to be utilized will depend upon the separation factor of the membrane, the flow rate of the feed substream, the permeability of the membrane to the desired permeating moiety, and the purity of the desired permeating moiety which is sought in the combined permeate. The non-permeates exit permeators 12, 14, 16 and 18 via lines 28, 30, 32, and 34. As shown, the non-permeates from the permeators are combined and exhausted from the permeator system via line 36.

The permeate from permeator 12 exits via line 38 and passes to an outlet line 40. The permeate from permeator 14 exits via line 42 containing control valve 44 which is adapted to be actuated to either an open or closed position. Permeate which passes through control valve 44 enters line 40 and is combined with permeate from permeator 12. The permeate from permeator 16 is withdrawn via line 46 containing control valve 48 which is similar to control valve 44. Permeate passing through control valve 48 then passes to line 40 for combination with permeates from other permeators. The permeate from permeator 18 is withdrawn via line 50 containing control valve 52. Control valve 52 is similar to control valve 44. Permeate passing through control valve 52 is passed to line 40 for combination with permeates from other permeators. After the combination of the permeate from second lines 38, 42, 46, and 50, the combined permeate is passed through flow meter 54. Flow meter 54 is also adapted to actuate control valves 44, 48, and 52 at predetermined combined flow rates. As depicted, flow meter 54 is in communication with valve 44 via line 56, control valve 48 via line 58 and control valve 52 via line 60. The actuation of the control valves may be by any suitable means including electrical, mechanical or pneumatic means. The combined permeate, after passing through flow meter 54 is passed to demand valve 62. Demand valve 62 is adapted to be adjusted to provide the desired combined permeate flow rate, e.g., demand valve 62 can provide a back pressure on the permeate side of the operating permeators such that only desired rates of combined permeate fluid flow are obtained. Demand valve 62 may also be adapted to provide the combined permeate exiting the permeator system at a substantially constant pressure at or below the minimum combined permeate pressure over the intended rate of permeate turn down ratios.

In operation, a feed stream is divided into feed substreams and passed to each of permeators 12, 14, 16 and 18. Demand valve 62 is opened to provide the desired combined permeate flow rate. With respect to FIG. 2, as the combined permeate flow rate increases, the demand for permeate from permeator 12 increases, and the permeate pressure from permeator 12 is reduced. The decrease in permeator pressure also increases the driving force for the permeation of the desired permeating moiety, and more permeate is obtained with an increase in the concentration of the desired moiety in the combined permeate. When the combined permeate fluid flow rate reaches a predetermined rate A, flow meter 54 actuates control valve 44 via line 56 and permeate is allowed to pass from permeator 14. The total pressure of the combined permeate is increased since a lesser differential in total pressure is required to obtain the same amount of permeate because of the increase in effective membrane surface area since another permeator is operating. Again, as the demand for combined permeate increases, the total pressure of the combined permeate decreases with the concentration of the desired permeating moiety in the combined permeate increasing. When the combined permeate fluid flow rate reaches a higher predetermined rate B, flow meter 54 actuates control valve 48 via line 58, and permeator 16 begins supplying permeate to meet the demand for combined permeate, and the total pressure of the combined permeate is increased. If the demand for combined permeate is further increased, flow meter 54 at higher predetermined rate C, will actuate control valve 52 via line 60, and permeate 18 will begin providing permeate to line 40 to meet the demand for combined permeate. A desired reduction in the rate of combined permeate fluid flow can be effected by closing demand valve 62, and at combined permeate fluid flow rates at C, B and A each of valves 52, 48, and 44 close in sequence.

Any selectively permeable material suitable for pressure-influenced fluid separations may find application in permeator systems in accordance with the invention. Typical membrane materials include organic polymers or organic polymer mixed with inorganics, e.g., fillers, reinforcements, and the like. Metallic and metal-containing membranes may also be employed. Polymeric membranes are usually preferred due to their ability to achieve satisfactory permeabilities without the need for excessively high temperatures. Polymers which may be suitable for fluid separations can be substituted or unsubstituted polymers, especially carbon based polymers having carbon-carbon or carbon-oxygen backbones, and may be selected from polysulfones; polystyrenes; polycarbonates; cellulosic polymers; polyamides and polyimides; polyethers; poly(arylene oxides); polyurethanes; polyesters; polysiloxanes; polysilanols; polysulfides; and polymers from monomers having alpha olefinic unsaturation other than mentioned above. The polymers may be interpolymers, including block interpolymers containing repeating units such as those mentioned above; and grafts and blends containing any of the foregoing. The membranes may be isotropic or anisotropic and may be supported or self-supporting. Frequently the separation factor of the membranes for the permeating moiety over the slower permeating moiety is at least about 3 and sometimes is at least about 10.

A permeator containing a selectively permeable membrane may be of any suitable design for fluid separations, e.g., plate and frame, or having spiral wound film membranes, tubular membranes, hollow fiber membranes, or the like. Preferably, the permeator comprises hollow fiber membranes due to the high effective membrane surface area per unit volume of permeator which can be obtained. When the membranes are in tubular or hollow fiber form, a plurality of the membranes can be substantially parallelly arranged in bundle form, and the feed stream can be contacted with either the outside (shell side) or the inside (bore side) of the membranes. Preferably, the feed stream is contacted with the shell side of the membrane since passage of the feed stream through the bore side of the membranes may involve substantially greater pressure losses. Since the concentration of the desired permeating moiety on the feed side of the membrane is continually diminishing as it permeates to the permeate side of the membrane, the chemical potential for the permeation of the permeating moiety across the membrane will also be changing. Therefore, flow patterns in a permeator can be utilized to provide desired recoveries of the desired permeating moiety. For instance, the permeate and the feed stream flows can be countercurrent or concurrent. With bundles of hollow fiber and tubular membranes, the shell side fluid flow can be radial, i.e., the fluid transversely flows past the membranes to either the inside or, usually, the outside of the bundle, or the flow can be axial, i.e., the flow dispersed within the bundle and generally flows within the direction in which the hollow fibers or tubular membranes are oriented.

The total pressure differential across the selectively permeable membrane varies in accordance with the processes of this invention. The maximum total pressure differential, however, should not be so great as to unduly stress the membrane such that it ruptures or is prone to easily rupturing, or such that the permeation properties of the membrane are not adversely affected. In many instances, the total pressure differential across the membrane is at least about 1 atmosphere, say, up to about 100 or 120 atmospheres.

The fluid separation processes of this invention are suitable for liquid and, most preferably, gaseous feed streams. The permeate may also be liquid or gaseous, thus the processes of this invention are also useful for pervaporation separations in which a gaseous permeate is obtained from a liquid feed stream. A particularly attractive use for the processes of this invention is for the separation of gases. For example, gases such as hydrogen, carbon dioxide, and oxygen are frequently needed for industrial processes as raw materials. Often, these gases are available from sources such as purge streams, chemical process streams, air, natural gas, and the like having relatively constant compositions. The processes of this invention permit the desired gas to be provided at an adequate purity and pressure even though wide variations in the demand for the gas may exist.

The following example is provided in illustration of a process in accordance with this invention. All parts and percentages of gases and liquids are by volume unless otherwise noted.

An apparatus similar to that depicted in FIG. 1 except that only three permeators are employed (i.e., no permeator 18 is present) is utilized to recover hydrogen from a hydrogen containing stream containing about 80 percent hydrogen, about 16 percent nitrogen, and about 2.5 percent of each of the methane and argon. The feed stream is at a pressure of about 115 atmospheres absolute. The flow rate of the feed stream is approximately 160,000 normal cubic meters per day. Approximately 53,000 normal cubic meters per day of the feed stream is passed to each of permeators 12, 14, and 16. Permeators 12, 14, and 16 are identical, and are hollow fiber-containing permeators of the types schematically depicted in U.S. Pat. No. 4,172,885, issued Oct. 30, 1979, herein incorporated by reference. Each permeator contains about 90 square meters of effective membrane surface area, and the membrane exhibits a hydrogen permeability of about $70 \times 10^{-6}$ cubic centimeters of hydrogen (STP) per square centimeter of surface area per second per centimeter of mercury partial pressure differential. The separation factor for hydrogen over argon is approximately 45, and the separation factor for hydrogen over each of nitrogen and methane is approximately 60.

Flow meter 54 is adapted to actuate control valve 44 at a combined permeate fluid flow rate of about 17,000 normal cubic meters per day and control valve 48 at approximately 34,000 normal cubic meters per day. At a flow rate of about 7,000 normal cubic meters per day, the purity of hydrogen in the combined permeate is approximately 97 volume percent, and the bore pressure (permeate pressure) is about 75 atmospheres absolute. At the flow rate of which control valve 44 is actuated, the permeate pressure is about 50 atmospheres absolute, and the hydrogen purity in the permeate is about 98.5 volume percent. When control valve 44 opens, the permeate pressure increases (at steady state conditions) to approximately 72 atmospheres absolute, and the permeate purity decreases to only about 97.8 volume percent. At the flow rate at which control valve 48 is actuated, the combined permeate pressure decreases to about 50 atmospheres absolute, and the permeate purity increases to about 98.6 volume percent. Upon opening control valve 48, the bore pressure increases (at steady state conditions) to about 60 atmospheres absolute, and the combined permeate contains about 98.3 volume percent hydrogen. At a combined permeate fluid flow of 50,000 normal cubic meters per day, the combined permeate pressure drops to about 48 atmospheres absolute and the hydrogen concentration of the combined permeate is about 98.5 volume percent.

It is claimed:

1. A permeator system for separating one gas from a mixture of said one gas and at least one other gas, comprising:
   a. at least two permeators connected in parallel, said permeators each having a membrane more permeable to said one gas than said other gas such that said one gas is separated from the mixture in said at least two permeators;
   b. an inlet line for feeding the mixture of gases to the permeator system;
   c. an outlet line for withdrawal of permeated one gas;
   d. each of said permeators having a first connecting line for feeding the gas mixture from the inlet line into each permeator to contact each membrane and a second connecting line for feeding said permeated one gas from each permeator to said outlet line;
   e. at least one of said connecting lines of one permeator having a valve means therein for stopping the flow of permeated gas from said one permeator to said outlet line; and
   f. a flow detector means connected in said outlet line, said flow detector means being connected to said valve means for actuating said valve means to lower the amount of effective membrane surface area in use when permeate flow rate in said outlet line falls below a predetermined rate and to increase the amount of effective membrane surface area in use when permeate flow rate rises above said predetermined rate, said surface area increases and decreases being effected by changing the number of permeators in use.

2. The system of claim 1 wherein said valve means is in said second connecting line.

3. The system of claim 1 wherein said valve means is actuated by said flow detector means to a substantially fully opened or substantially fully closed position.

4. The permeator system of claim 1 wherein each permeator has substantially the same effective membrane area.

5. The permeator system of claim 1 in which said membranes are in the form of hollow fiber membranes.

6. The permeator system of claim 5 wherein said system has at least three permeators, with at least two of said permeators being provided with said valve means.

7. The permeator system of claim 6 in which said predetermined rate of fluid flow is different for said at least two permeators.

* * * * *